United States Patent [19]

Ichinoi et al.

[11] Patent Number: 4,630,131

[45] Date of Patent: Dec. 16, 1986

[54] RECORDING SIGNAL GENERATION SYSTEM FOR COLOR VIDEO SIGNAL

[75] Inventors: Yutaka Ichinoi, Yokohama; Naomichi Nishimoto, Tokyo; Yoshihiko Ota, Yokohama, all of Japan

[73] Assignee: Victor Company of Japan, Limited, Yokohama, Japan

[21] Appl. No.: 577,119

[22] Filed: Feb. 6, 1984

[30] Foreign Application Priority Data

Feb. 9, 1983 [JP] Japan ............................ 58-20461

[51] Int. Cl.⁴ .................... H04N 9/493; H04N 9/499
[52] U.S. Cl. .................................. 358/310; 358/12; 358/14; 358/323; 358/330
[58] Field of Search .................. 358/310, 328, 11, 12, 358/14, 145, 147, 323, 330

[56] References Cited

U.S. PATENT DOCUMENTS

| | | |
|---|---|---|
| 3,781,463 | 12/1973 | Van Den Bussche .......... 358/320 X |
| 4,127,865 | 11/1978 | Poetsch ................... 358/12 |
| 4,245,235 | 1/1981 | Poetsch ................... 358/14 |

Primary Examiner—Robert L. Richardson
Attorney, Agent, or Firm—Jordan and Hamburg

[57] ABSTRACT

A recording signal generation system for a color video signal which is suitable for high density recording in a magnetic recording and playback apparatus. In each horizontal scan period which includes an effective horizontal scan period and a horizontal blanking period arranged serially on the time axis, a luminance signal is positioned in the effective horizontal scan period while, in the horizontal blanking period, compressed color signals generated by time-axis compressing color signals having a duration equal to the effective horizontal scan period by a predetermined ratio are disposed. The luminance signal and compressed color signals are time-division multiplexed. Special burst pilot signals are superposed on the multiplex signal each of which is separable from the compressed color signals and alternate with the other at an interval of one horizontal scan period, thereby discriminating the color signals from each other while indicating a position of horizontal blanking period. A carrier having a suitable frequency is frequency modulated by the superposed signal and the modulated output is used as a recording signal.

8 Claims, 13 Drawing Figures

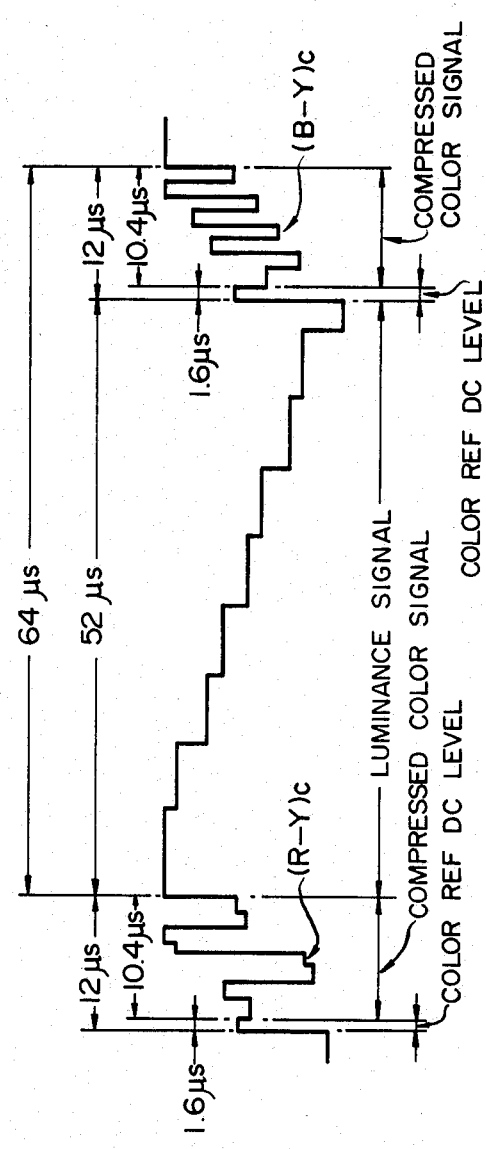
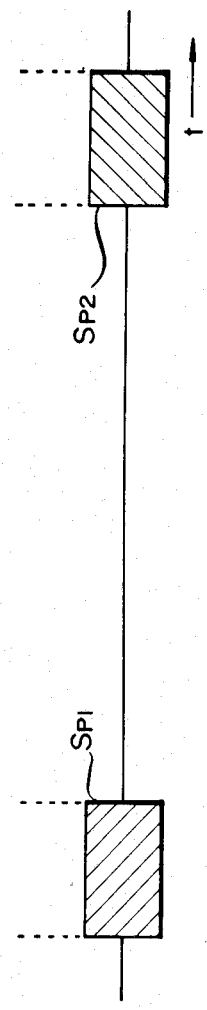
FIG. 3a
FIG. 3b

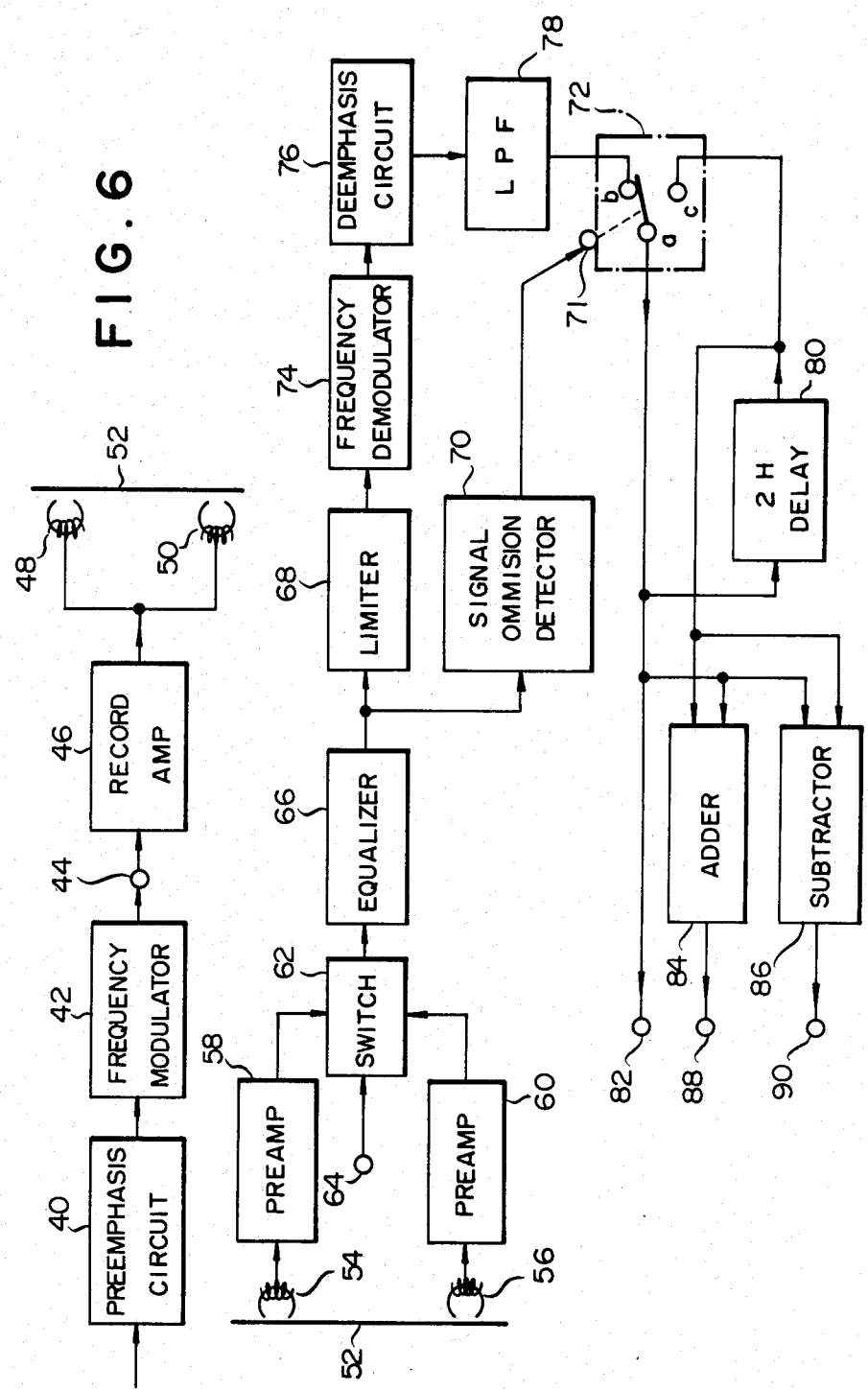

RECORDING SIGNAL GENERATION SYSTEM FOR COLOR VIDEO SIGNAL

BACKGROUND OF THE INVENTION

The present invention relates to a recording signal generation system for a color video signal which is desirably applicable to high density recording in a magnetic recording and playback apparatus.

Various magnetic recording and playback apparatuses have been proposed in the art of video tape recorders (VTR) and like magnetic recording and playback apparatuses for the purpose of recording information signals in high densities.

For example, in a magnetic recording and playback apparatus of the type using a magnetic recording medium, particularly a magnetic tape, use is made of two read and write heads each having a head gap whose lengthwise position is inclined a small angle ($\pm 6$-$7$ degrees) relative to a direction perpendicular to an extension of a track on a magnetic tape, i.e., two read and write heads having head gaps which are different from each other in azimuth angle. The heads undesirably trace adjacent tracks on the magnetic tape but minimize reproduction of information in the adjacent tracks, or crosstalk, causing a so-called azimuth loss which is derived from the magnetic recording and playback theory. Such eliminates the need for a guard band heretofore provided between adjacent tracks, and thereby allows information to be written into the magnetic tape in a high density.

In a recording and playback system of the above-described type which uses the azimuth effect, information in adjacent tracks is minimized to be reproduced due to the azimuth loss so long as recorded signals have relatively short wavelengths, that is, they belong to a high frequency band. This eliminates a beat problem on the reproduced pictures which would otherwise be caused by signals in a high frequency band recorded in adjacent tracks. However, where the recorded signals have relatively long wavelengths, that is, they belong to a low frequency band in which the azimuth effect is insufficient, signals in adjacent tracks would appear in a reproduced signal as crosstalk. Assume, for example, a case wherein the signal to be magnetically recorded and reproduced is a signal generated by multiplexing a frequency modulated version of a luminance signal, which occupies a high frequency band, and a version of a carrier color signal which has been converted into a frequency lower than the frequency modulation (FM) band of the luminance signal, i.e. low frequency band converted carrier color signal. In such a case, no azimuth effect is expected of the low frequency band converted carrier color signal, resulting in incomplete removal of the crosstalk.

To solve the problem discussed above, there have been proposed a magnetic recording and playback apparatus employing the so-called "carrier offset system" in which the frequency of the carrier color signal is selected to interlace successive tracks, as disclosed in Japanese Patent Laid-Open Publication No. 50-34419/1975, a magnetic recording and playback apparatus employing the so-called "PI system" in which the phase of a carrier color signal in one track is changed by 180 degrees for each horizontal scan period, 1H, as disclosed in Japanese Patent Laid-Open Publication No. 50-42733/1975, a magnetic recording and playback apparatus employing the so-called "PS (phase shift) system" in which the phase of the carrier color signal is rotated 90 degrees for each 1H and the rotating direction is changed track by track, as disclosed in Japanese Patent Laid-Open Publication No. 52-48919/1977, etc. Such implementations have won worldwide popularity as well known in the art.

The problem heretofore pointed out is that the various systems mentioned above cannot effect desirable recording or reproduction of a color video signal unless the color video signal conforms to a color TV system in which a luminance signal and a carrier color signal are multiplexed sharing the frequency band of the luminance signal, e.g. NTSC (National Television System Committee) System or PAL (Phase Alternation Line) system. In the SECAM (Séquentiel á Mémoire) system, for example, a color video signal is made up of a luminance signal and color signals which are in an FM signal mode and, therefore, the FM wave of the color signals, even if recorded and reproduced after being shifted to a lower frequency range, do not have horizontal correlation. It follows that even the various systems previously described fail to fully eliminate crosstalk from adjacent tracks. Except for the problems discussed later in this specification which led the present invention, such a problem may be solved by recording a color video signal of which a luminance signal and color signals are time-division multiplexed.

Today, the time axis of a signal is readily adjustable using semiconductor devices. This has promoted transmission and recording of a color video signal having a specific mode in which a luminance signal and time-axis compressed color signals are arranged serially on the time axis. As well known in the art, in the NTSC color TV system, a color video signal is allowed to occupy a narrow frequency band taking advantage of a peculiarity of human eyesight which is far poorer for a difference in color in a small area on a screen than for a difference in brightness in such an area. For example, concerning the Japanese standard color TV system (common to the NTSC system), while the luminance signal representing brightness information occupies a frequency range of 0–4 MHz, the color signals representing color information are 1.5 MHz for a wide band signal (I signal) and 0.5 MHz for a narrow band signal (Q signal). Also, the luminance signal and the color signals are kept in a mode which allows them to be separated from each other within an effective horizontal scan period in one horizontal scan period, 1H, which accords to predetermined scanning standards.

In one horizontal scan period, 1H, the effective horizontal scan period for which the luminance signal and the color signal coexist and a horizontal blanking period which is shorter in duration than the effective horizontal scan period and has a horizontal sync signal therein are arranged serially on the time axis. For this reason, time-division multiplexing of the luminance signal and the color signals is attainable if one of them which separably coexist in an effective horizontal scan period is put in the effective horizontal scan period, and the other in a blanking period after time-axis compression. In time-division multiplexing a luminance signal and color signals, it is desirable from efficient band utilization and other viewpoint that the color signals which occupies a narrower frequency band than the luminance signal does, be time-axis compressed to become color signals whose occupying frequency band is substantially the same as that of the luminance signal, and be arranged in a horizontal blanking period. The two color signals are time-division multiplexed with the luminance signal alternately at every interval of one horizontal scan period, the multiplexed signal being a so-called time-sequential signal.

In the color video signal having the above-described mode, the luminance signal and the color signals have been time-division multiplexed and, therefore, they will never exist at the same time or interfere with each other. Concerning energy distribution, both the luminance signal and the color signals are large in the low frequency range and small in the high frequency range and such is suitable for frequency modulation. Furthermore, the color video signal of the type concerned allows a minimum of time-axis fluctuation to occur during a recording or playback operation with a recording medium, compared to the NTSC system or the PAL system which employs a color subcarrier. Additionally, in the system using two heads having azimuth angles, no anti-crosstalk measure is required because the color signal will never appear in the low frequency range which often entails crosstalk.

FIG. 1 shows an exemplary waveform of a color video signal having a luminance signal arranged in an effective horizontal scan period and time-axis compressed color signals in a horizontal blanking period, as previously described. The illustrated color video signal is generated by time-division multiplexing a luminance signal and compressed color signals under a condition wherein the effective horizontal scan period of 52 microseconds of the CCIR (International Radio Consultive Committee) signal having 625 scan lines an interlace scan rate of 2, and 25 pictures per second (50 fields per second) has been modified to 50 microseconds.

In FIG. 1, the duration of 64 microseconds is the one horizontal scan period and that of 50 microseconds is the effective horizontal scan period in which a luminance signal is disposed. The duration of 14 microseconds is the horizontal blanking period in which, for the period of 4 microseconds, a horizontal scan signal and a DC level for color reference are arranged and, for the period of 10 microseconds, compressed color signals are arranged. The color signals to be multiplexed with the luminance signal are shown as signals (R-Y)c and (B-Y)c which are the compressed versions of color difference signals (R-Y) and (B-Y) respectively.

The color video signal shown in FIG. 1 is one which has been proposed as being applicable to a magnetic recording and playback apparatus.

As described above, in the color video signal of FIG. 1, a 4-microsecond period is employed to arrange a horizontal sync signal and a DC level for color reference within the horizontal blanking period, while color signals having a duration of 50 microseconds are compressed to be the signals (R-Y)c and (B-Y)c having a duration of 10 microseconds. Therefore, the effective horizontal scan period is 50 microseconds which is the difference between one horizontal scan period, 64 microseconds, and the duration of (10+4) microseconds.

A problem encountered with the proposed color video signal is that the effective horizontal scan period is 50 microseconds as already mentioned which is 2 microseconds shorter than the original effective horizontal scan period in the CCIR signal, 52 microseconds, the information signal being omitted for the duration of 2 microseconds. While this problem may be solved by time-axis compressing the luminance signal as well as the color signals, difficulty is experienced in so compressing the luminance signal because it is a wide band signal and the apparatus becomes costly and intricate.

Further, although such a color video signal includes two different kinds of color signals which are line sequentially arranged on the time axis, it does not contain any color signal discrimination data (color discriminating signal) on a horizontal scan period basis. Therefore, any disturbance caused in the signal condition for one reason or another would render the signal processing inadequate. This also holds true for the SECAM system, for example, which contains color signal discrimination data in a vertical blanking period. The term "time compressed" is commonly used in the art in systems to which the present invention pertains and may be found, for example, in U.S. Pat. No. 4,245,235.

SUMMARY OF THE INVENTION

It is therefore an object of the present invention to provide a new and useful recording signal generation system for a color video signal which is a solution to the problems heretofore left unsolved and capable of readily generating a color video signal for a magnetic recording and playback apparatus.

It is another object of the present invention to provide a generally improved recording signal generation system for a color video signal.

In accordance with one aspect of the present invention, a recording signal generation system for a color video signal has horizontal scan periods each of which has an effective horizontal scan period and a horizontal blanking period arranged serially with respect to time, a luminance signal being positioned in the effective horizontal scan period. The system comprises a first signal generator for separating an input composite color video signal to generate the luminance signal and a line sequential signal of two color difference signals which has a duration equal to the effective horizontal scan period, a second signal generator for generating compressed color signals by compressing the line sequential signal with respect to the time axis by a predetermined ratio, a third signal generator for positioning the compressed color signals in the horizontal blanking period and time-division multiplexing the luminance signal and the compressed color signals to generate a time-division multiplex signal of the luminance signal and the compressed color signals, a fourth signal generator for generating a plurality of burst pilot signals each of which is separable from the compressed color signals in the horizontal blanking period and alternates with the other at an interval of one horizontal scan period, a fifth signal generator for superposing the burst pilot signals on the time-division multiplex signal, and a sixth signal generator for generating a recording signal by frequency modulating a carrier having a predetermined frequency by the superposed signal.

In accordance with another aspect of the present invention, a recording signal generation system for a color video signal has horizontal scan periods each of which has an effective horizontal scan period and a horizontal blanking period arranged serially on a time axis and a vertical blanking period having a sync signal and a luminance signal in the effective horizontal period, a luminance signal being positioned in the effective horizontal scan period. The system comprises a first signal generator for separating an input composite color video signal to generate the luminance signal and a line sequential signal of two color difference signals which has a duration equal to the effective horizontal scan period, a second signal generator means for generating compressed color signals by compressing the line sequential signal with respect to the time axis by a predetermined ratio, a third signal generator for positioning the compressed color signals in the horizontal blanking period and time division multiplexing the luminance signal and the compressed color signals to generate a time-division multiplex signal of the luminance signal and the compressed color signals, a fourth signal generator for generating a plurality of burst pilot signals each of which is separable from the compressed color signals in the horizontal blanking period and alternates with the other at an interval of one horizontal scan period, a fifth signal generator means for superposing the burst pilot signals and the sync signal in the vertical blanking period on the time-division multiplex signal, and a sixth signal generator for generating a recording signal by frequency modulating a carrier having a predetermined frequency by the superposed signal.

The above and other objects, features and advantages of the present invention will become more apparent from the following detailed description taken with the accompanying drawing.

BRIEF DESCRIPTION OF THE DRAWING

FIGS. 3a, 3b, 4a–4c and 5a–5d are diagrams showing waveforms of a color video signal in accordance with the present invention;

FIG. 6 is a block diagram showing an example of a recording and playback arrangement applicable to the present invention.

DESCRIPTION OF THE PREFERRED EMBODIMENT

While the recording signal generation system for a color video signal of the present invention is susceptible of numerous physical embodiments, depending upon the environment and requirements of use, a substantial number of the herein shown and described embodiment have been made, tested and used, and all have performed in an eminently satisfactory manner.

Figure 1:
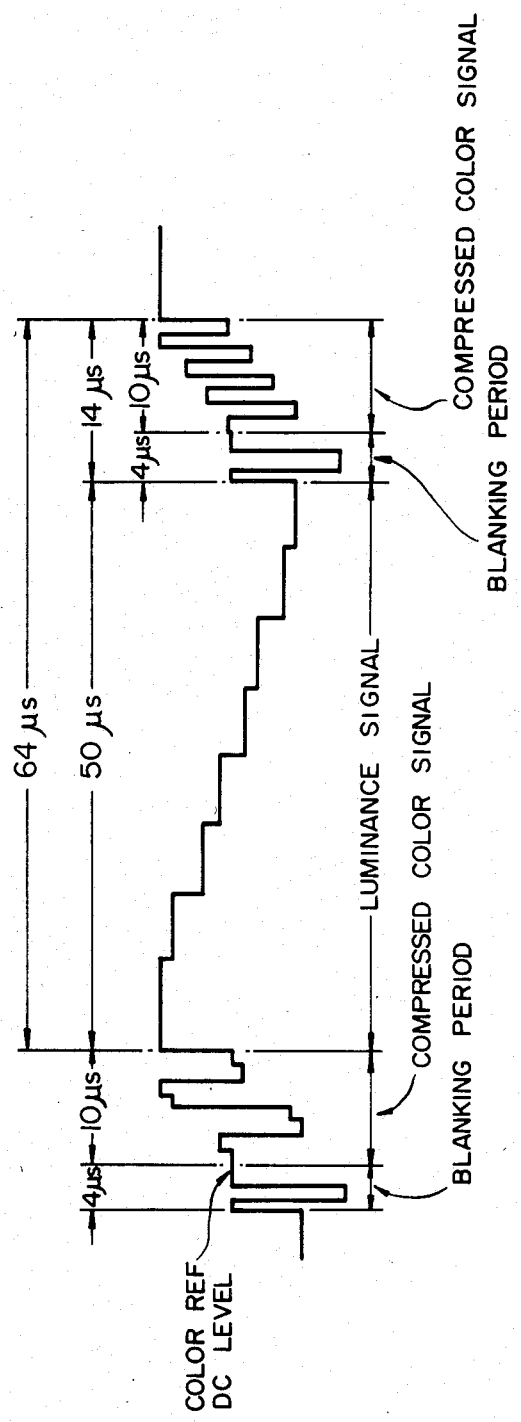
FIG. 1 is a diagram showing a waveform of a prior art color video signal.
Figure 2:
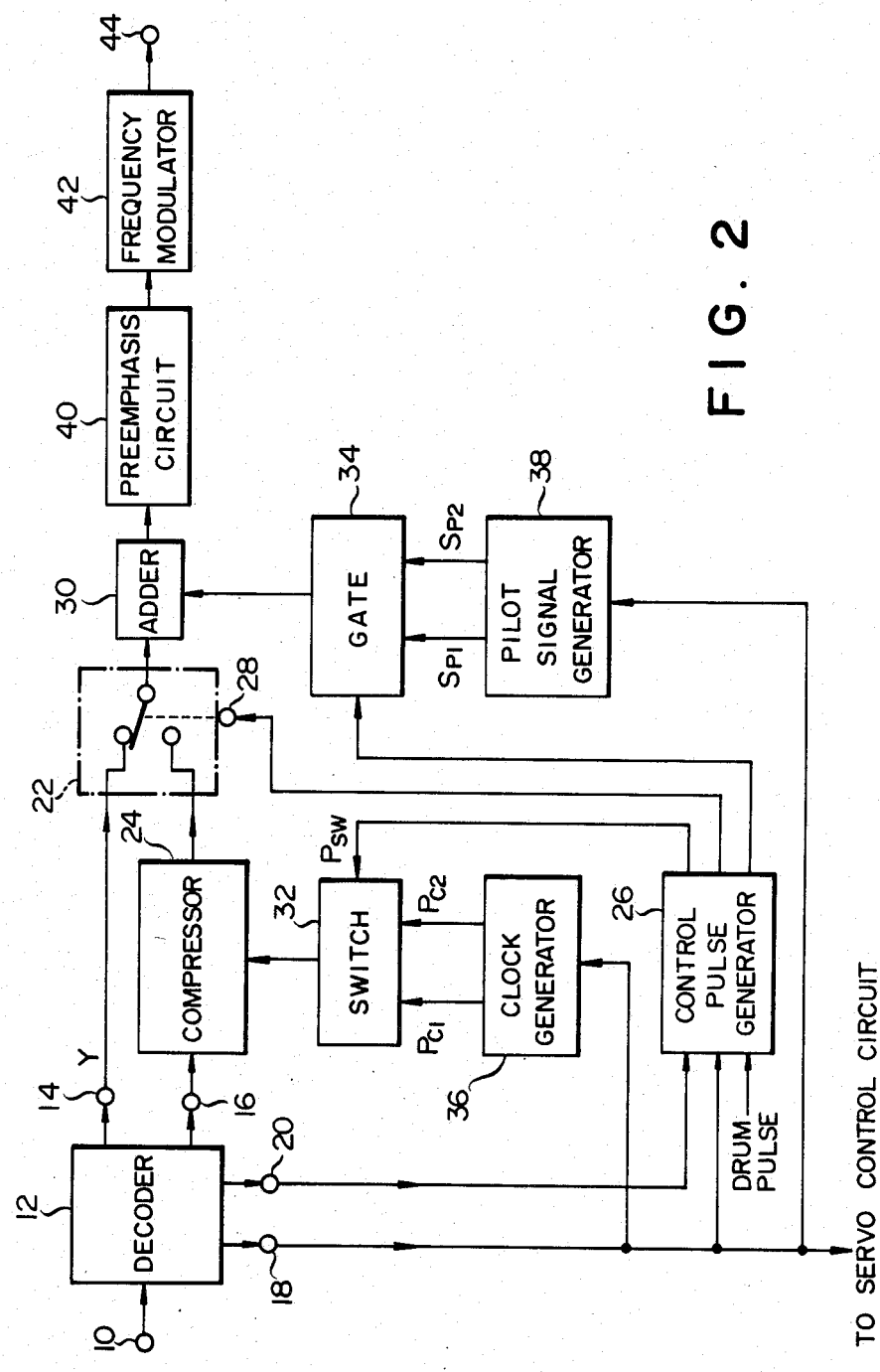
FIG. 2 is a block diagram of a recording signal generation system for a color video signal embodying the present invention.

Referring to FIG. 2, a recording signal generation system in accordance with the present invention is shown. A composite video signal is applied to a decoder 12 through an input terminal 10. From the incoming color video signal, the decoder 12 generates a luminance signal Y, a line sequential signal made up of two color signals each being preceded by a color reference DC level (e.g. two color difference signals (R-Y) and (B-Y)), sync signals and a color signal discrimination pulse signal. The luminance signal, Y, is applied to a terminal 14, the line sequential signal of the two color signals to a terminal 16, the sync signal to a terminal 18, and the color signal discrimination pulse signal to a terminal 20.

In detail, where the composite color video signal supplied to the decoder 12 has a mode in which two color signals and a luminance signal are multiplexed in the frequency band of the latter, as in the case of a composite color video signal according to the NTSC system or the PAL system, the decoder 12 separates the video signal into a luminance signal and a carrier color signal. The luminance signal is delivered to the terminal 14. The carrier color signal is synchronuously detected and then processed by a matrix circuit in the decoder 12 to become two color signals, e.g. two color difference signals (R-Y) and (B-Y). These color signals are applied to the terminal 16 as a line sequential signal (each color signal is preceded by a color reference DC level). Sync signals such as horizontal and vertical sync signals separated from the luminance signal are delivered to the terminal 18. Further, the color signal discriminating pulse signal output from the decoder 12 is adapted to determine which one of the color signals is at the terminal 16. Meanwhile, where the composite color video signal is made up of a frequency modulated wave of a line sequential signal of two color signals and a luminance signal, as is the case with the SECAM system, the decoder 12 separates the video signal into a luminance signal and a frequency modulated wave of a line sequential signal of two color signals. Then, the decoder 12 applies the luminance signal to the terminal 14, frequency demodulates the frequency modulated signal to apply the resulting line sequential signal of two color signals to the terminal 16 (each color signal being preceded by a color reference DC level), delivers horizontal, vertical and other sync signals separated from the luminance signal to the terminal 18, and prepares a discrimination pulse signal for determining which one of the color signals is at the terminal 16 and applies the pulse signal to the terminal 20. The decoder 12 may comprise a device of MATSUSHITA AN5630, for example. If desired, the decoder 12 may be replaced by a signal generator which is constructed to generate a luminance signal, a line sequential signal made up of two signals, sync signals and a discrimination pulse signal.

The luminance signal Y appearing at the terminal 14 of the decoder 12 is routed to a time-division multiplexer (switching circuit) 22. The line sequential signal of two color signals (hereinafter, a line sequential signal constituted by (R-Y) and (B-Y) signals) is fed to the multiplexer 22 via a time-axis compression circuit, or compressor, 24. An example of the output of the multiplexer 22 is shown in FIG. 3a. In FIG. 3a, the time-division signal includes the luminance signal in a 52-microsecond effective horizontal scan period of one 64-microsecond horizontal scan period, and the 1.6-microsecond color reference DC level and the 10.4-microsecond compressed color signal (R-Y)c or (B-Y)c in a 12-microsecond horizontal blanking period. The color signal (R-Y)c or (B-Y)c has been prepared by compressing a 52-microsecond color signal to 1/5 by the compressor 24. The multiplexer 22 is controlled by a control signal applied to its terminal 28 from a control pulse generator 26. In response to the control signal, the multiplexer 22 selectively passes therethrough the luminance signal Y and the compressed color signals (R-Y)c and (B-Y)c. The resulting signal having such signals arranged serially on the time axis is sent out to an adder 30.

The control pulse generator 26, supplied with the sync signals from the terminal 18 of the decoder 12 and the discrimination pulse signal from the terminal 20, generates various control signals including the control pulses for the multiplexer 22 and control signals for a switch 32, a gate circuit 34 and the like which will be described.

The compressor 24 may have any desired construction such as one which employs a charge coupled device (CCD) (e.g. MATSUSHITA MN8028) to compress the input signal as an analog signal, or one which converts the input signal into a digital signal by means of an analog-to-digital converter (e.g. RCA 3300D) and then compresses the digital signal using a digital memory (e.g. INTEL 2149M). Where a digital memory is used as time-axis compression means, a digital-to-analog converter may be employed in order to convert a digital signal into an analog signal. In this respect, it is desirable to use a CCD or like device as a time-axis compressor for time-axis compansion so as to simplify the construction. The time-axis compression circuit 24 and a time-axis expansion circuit, which will be described, are identical with each other in that the time-axis conversion is effected by switching the repetition frequency of a clock signal fed to a CCD or a digital memory.

In FIG. 2, a clock signal generator 36 generates a clock signal $Pc_1$ having a low repetition frequency and a clock signal $Pc_2$ having a high repetition frequency which is in a predetermined ratio to the clock signal $Pc_1$. The clock signals $Pc_1$ and $Pc_2$ are supplied to the switch 32. The clock signal generator 36 comprises, for example, a phase locked loop (PLL) circuit in order that it may generate the clock signals $Pc_1$ and $Pc_2$ of predetermined repetition frequencies in response to a horizontal sync signal which appears at the terminal 18 of the decoder 12.

The repetition frequency ratio between the clock signals $Pc_1$ and $Pc_2$ output from the clock signal generator 36 is predetermined in correspondence with a compression ratio assigned to the compressor 24 and an expansion ratio assigned to a time-axis expander, which will appear later. Assuming that the compression ratio is 5 to 1 as in the previously described example, and that the horizontal sync signal of the composite color video signal which includes color signals has a repetition frequency fH, the repetition frequency of the clock signal $Pc_1$ may be selected to be 80fH and that of the clock signal $Pc_2$, 400fH, in order to set up a compression ratio at the compressor 24 or an expansion ratio at the expander of 80:400=1:5.

Assuming that the repetition frequency fH of the horizontal sync signal is 15.625 KHz, the repetition frequencies of the clock signals $Pc_1$ and $Pc_2$ represented by 80fH and 400fH in the described example are 1.25 MHz and 6.25 MHz respectively. Thus, the embodiment of the present invention will be described on the assumption that the composite video signal arriving at the terminal 10 includes a horizontal sync signal whose repetition frequency fH is 15.625 KHz (meaning a horizontal scan period of 64 microseconds), while the compression ratio (and expansion ratio) to the color signals is "5". It is also assumed in the embodiment that the compressor 24 (and expander) comprises a 67-stage CCD.

Figure 4A:
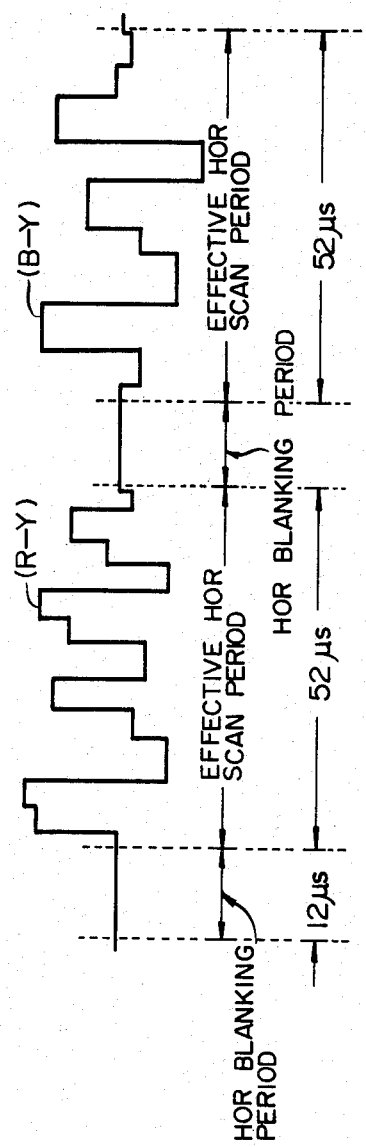
Figure 4B:
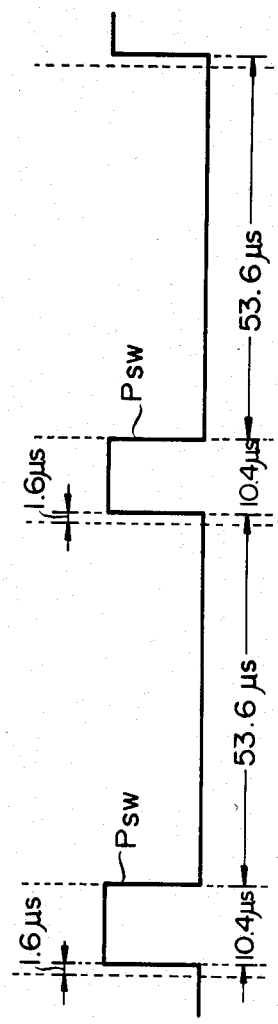

Among the two clock signals $Pc_1$ and $Pc_2$ output from the clock signal generator 36, the clock signal $Pc_1$ having a lower repetition frequency is selected by the switch 32 for the period represented by a 53.6-microsecond duration in FIG. 4b, thereby being supplied to the 67-stage CCD. For the period of 10.4 microseconds in FIG. 4b, the other clock signal $Pc_2$ having a higher repetition frequency is fed to the 67-stage CCD via the switch which is used as the compressor 24. Such an operation of the switch 32 is effected by a control signal Psw which is supplied to the switch 32 from the control pulse generator 26.

It will be apparent from the description made so far that the color signal (R-Y) or (B-Y) is supplied from the compressor 24 to the multiplexer 22 as a 5:1 compressed color signal (R-Y)c or (B-Y)c by causing the 67-stage CCD to store in response to the clock signal $Pc_1$ the two signals which appear for the sum of the 52-microsecond effective horizontal scan period and the 1.6-microsecond color reference DC level, i.e. 53.6 microseconds, and then supplying the clock signal $Pc_2$ to deliver the color signal out of the CCD as a signal whose duration is 10.4 microseconds.

Figure 4C:
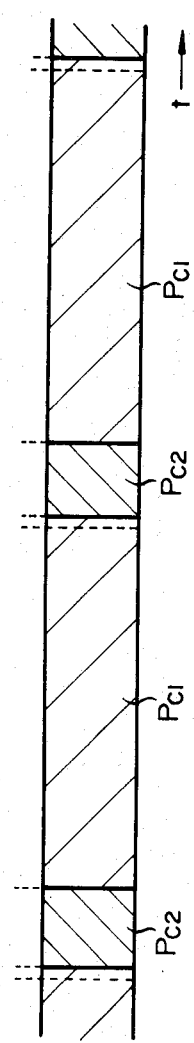

The line sequential color signals output from the terminal 16 of the decoder 12 is shown in FIG. 4a, and the control signal Psw for the switch 32 in Fig. 4b. The durations of the two different clock signals $Pc_1$ and $Pc_2$ fed to the compressor 24 via switch 32 are indicated in FIG. 4c.

The multiplexer 22 performs a switching operation such that the luminance signal Y and the compressed color signal (R-Y)c or (B-Y)c output from the compressor 24 are arranged serially on the time axis in the mode shown in FIG. 3a. The switching operation is controlled by the control signal applied to the terminal 28 from the control pulse generator 26, as previously discussed. As exemplified by the waveform shown in FIG. 3a, the multiplex output of the multiplexer has a 52-microsecond horizontal scan period and an effective horizontal scan period which is identical with the original effective horizontal scan period of the CCIR signal. However, the multiplex output in accordance with the present invention does not include any horizontal sync signal in its horizontal blanking period.

Now, in a time-division multiplex signal of a mode in which a luminance signal appears in an effective horizontal scan period and compressed color signals in a horizontal blanking period, a sync signal is essential for original synchronization and for expanding the time-axis of compressed color signals to reconstruct original color signals. Therefore, a time-division multiplex signal which lacks a sync signal as shown in FIG. 3a is impractical.

In accordance with the recording signal generation system of the present invention, two different kinds of burst pilot signals appear alternately each for every two horizontal scan periods. Each of the pilot signals is superposed on but separable from signals which are present in a horizontal blanking period. Thus, the pilot signals serve to indicate positions of horizontal blanking periods (positions of horizontal sync signals) and to identify two color signals which are line sequentially arranged. FIG. 3b shows burst pilot signals $Sp_1$ and $Sp_2$ which are to be superposed on the time-division multiplex signal shown in FIG. 3a. The pilot signals $Sp_1$ and $Sp_2$ have different frequencies each of which is an odd multiple of $\frac{1}{4}$ of the repetition frequency fH of the horizontal sync signal. Where the repetition frequency of the horizontal sync signal is 15.625 KHz as in the previously discussed example, the following frequencies may be selected for the pilot signals $Sp_1$ and $Sp_2$:

$Sp_1 = fH/4 \times 693 = 2707031.25$ Hz $Sp_2 = fH/4 \times 729 = 2847656.25$ Hz Under the condition described in which the frequencies of the burst pilot signals $Sp_1$ and $Sp_2$ are predetermined to be odd multiples of ¼ of the frequency fH of the horizontal sync signal, they can be desirably separated from compressed color signals if use is made of a comb filter which is constructed to include a 2H delay line.

The pilot signals $Sp_1$ and $Sp_2$ are individually generated by a pilot signal generator 38 and fed to the adder 30 via the gate 34 to be superposed on the multiplex output of the multiplexer 22. Comprising a PLL circuit, for example, the pilot signal generator 38 generates the two different pilot signals $Sp_1$ and $Sp_2$ and supplies them to the gate 34 in response to the sync signal which is applied thereto from the decoder 12 via the terminal 18. The gate 34 is actuated by a gate signal output from the control pulse generator 26 so that the pilot signals $Sp_1$ and $Sp_2$ are alternately applied to the adder 30 for successive horizontal blanking periods. The pilot signals $Sp_1$ and $Sp_2$ commonly have a duration which is equal to the horizontal blanking period, i.e. 12 microseconds.

Thus, the color video signal output from the adder 30 has the two burst pilot signals $Sp_1$ and $Sp_2$ superposed on color signals in horizontal blanking periods which are sequential on the time axis. Such signals $Sp_1$ and $Sp_2$ are usable to distinguish the kinds of color signals which appear in successive horizontal blanking periods of a color video signal. The output signal of the adder 30 is preemphasized by a preemphasis circuit 40 an output of which is applied to a frequency modulator 42 as a signal wave. The frequency modulator 42 modulates a suitable carrier by the input signal wave and delivers the resulting frequency modulated wave to an output terminal 44 as a recording signal. The frequency modulator 42 may comprise MATSUSHITA AN6306, for example.

It will be understood from the above description that in accordance with the present invention a luminance signal is positioned in an effective horizontal scan period of each horizontal scan period, while color signals generated by compressing color signals each having a duration equal to the effective horizontal scan period by a predetermined compression ratio are positioned in a horizontal blanking period, so that the luminance signal and color signals may be time-division multiplexed. The color signals to be multiplexed with the luminance signal are alternately selected for each horizontal scan period. Furthermore, two different kinds of pilot signals alternate with each other each of which appears in a horizontal blanking period and in every second horizontal scan period to be separably superposed on color signals. The superposed or multiplex signal is adapted to modulate a carrier having a suitable frequency to generate a recording signal. Thus, the system of the present invention effectively eliminates all the drawbacks particular to the prior art systems.

Reference will be made to FIGS. 5a–5d for describing a signal mode in a vertical blanking period of a color video signal.

Figure 5A:
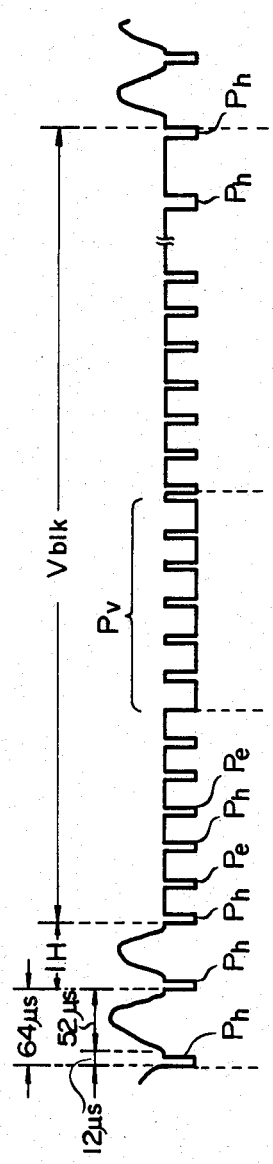

FIG. 5a shows a signal waveform which may appear in and in the neighborhood of a vertical blanking period. A signal having such a waveform accompanies the luminance signal which is applied from the terminal 14 of the decoder 12 to the multiplexer 22. In Fig. 5a, the waveform includes horizontal sync signals Ph, equalizing pulses Pe and vertical sync pulses Pv. A vertical blanking period is indicated by Vblk. The durations discussed in the previous example are employed for the respective portions of the waveform.

Figure 5B:
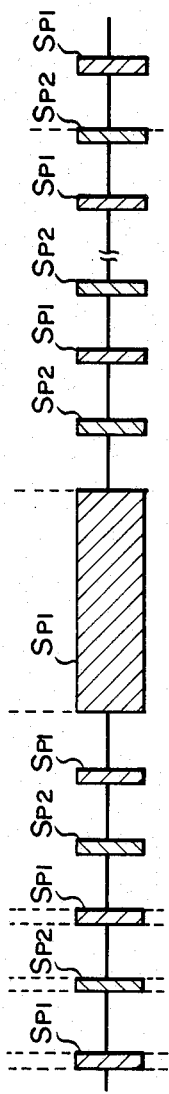
Figure 5C:
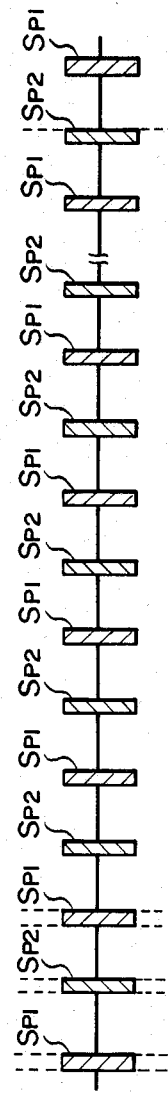
Figure 5D:
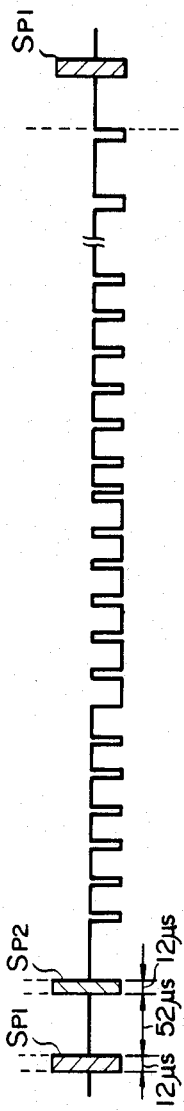

Various states of the signal output from the adder 30 of FIG. 2 are represented in FIGS. 5b–5d. In FIG. 5b, pilot signals $Sp_1$ and $Sp_2$ each having a duration of 12 microseconds and alternating with each other in correspondence with sequential horizontal blanking periods are positioned in the vertical blanking period Vblk. While the vertical scan signals Pv successively appear, a pilot signal $Sp_1$ whose duration corresponds to the pulse duration of the vertical sync signal, 160 microseconds, appears. In FIG. 5c, pilot signals $Sp_1$ and $Sp_2$ each having a duration of 12 microseconds simply alternate with each other even in the vertical blanking period Vblk without distinguishing the period of the vertical scan signal Pv from the others. In FIG. 5d, in the vertical blanking period Vblk, pulses accompanying the luminance signal Y fed from the output terminal 14 of the decoder 12 to the multiplexer 22 are allowed to directly appear, that is, the pilot signals are not superposed in the vertical blanking period Vblk. Whichever of the signal modes shown in FIGS. 5b–5d may be selected as a signal mode in a blanking period Vblk, it will be readily achieved by predetermining the mode of the control signal fed to the terminal 28 of the multiplier 22 and that of the gate signal applied to the gate 34 accordingly.

Where the signal waveform in a vertical blanking period Vblk is one shown in FIGS. 5b or 5d, it will be apparent that the vertical sync signals Pv can be readily generated at the playback side. Even if the signal mode in a vertical blanking period Vblk is one shown in FIG. 5c, reproduction of signals will not be obstructed at all because vertical sync signals Pv may be generated with ease with reference to time positions of drum pulses of a VTR. The signal mode shown in Fig. 5b or 5c as appearing in a vertical blanking period Vblk will simplify the procedure for preparing the burst pilot signals and the construction of a playback arrangement. The signal mode shown in FIG. 5d will enhance the fidility of information concerned with vertical sync signals and, thereby, improve the accuracy and signal-to-noise (S/N) ratio of vertical sync signals.

Referring to FIG. 6, a recording and playback arrangement is shown which may be used to write into and read out of a magnetic recording medium a signal generated by the recording signal generation system of the present invention. The preemphasis circuit 40, frequency modulator 42, terminal 44 and the like are common to those structural elements of FIG. 2 which are designated by like reference numerals. In FIG. 6, the reference numeral 46 designates a record amplifier (which may comprise MATSUSHITA AN6307), while the reference numerals 48 and 50 designate magnetic heads. Further designated by the reference numeral 52 is a magnetic recording medium, or tape as will be referred to hereinafter. Signals written into the magnetic tape 52 by the magnetic heads 48 and 50 are read out by magnetic heads 54 and 56, amplified by preamplifiers 58 and 60, and then routed to a switching circuit 62. In response to drum pulses arriving at a terminal 64, the switching circuit 62 alternately delivers output signals of the preamplifier 58 and those of the preamplifier 60 to an equalizer 66. The signal output of the equalizer 66 is applied to a limiter 68 and a signal omission detector 70. The output of the signal omission detector 70 is applied to its terminal 71 to control a switch 72. The output of the limiter 68, on the other hand, is demodulated by an FM demodulator 74, deemphasized by a deemphasis circuit 76, and then fed to a stationary contact b of the switch 72 via a low pass filter 78.

In response to an output of the signal omission detector 70, a movable contact a of the switch 72 is shifted from the stationary contact b to a stationary contact c. That is, when the signal omission detector 70 has detected any omitted signal, it causes the switch 72 to shift the movable contact a from the stationary contact b to the stationary contact c. A 2H delay circuit 80 is connected between the contacts a and c. The contact a is connected to a terminal 82, one input of an adder 84, and one input of a subtractor 86. The contact c is connected to the other input of the adder 84 and the other input of the subtractor 86. The adder 84 and 2H delay line 80 constitute in combination a comb filter. The adder 84 is connected to an output terminal 88 so that the multiplex signal of compressed color signals and luminance signal Y appears thereat. The subtractor 86 and 2H delay line 80 cooperate to serve as a comb filter. The subtractor 86 is connected to a termainal 90 so as to apply thereto the burst pilot signals $Sp_1$ and $Sp_2$. Appearing at the terminal 82 is a signal in which the pilot signals $Sp_1$ and $Sp_2$ are superposed on the multiplex signal.

Figure 7:
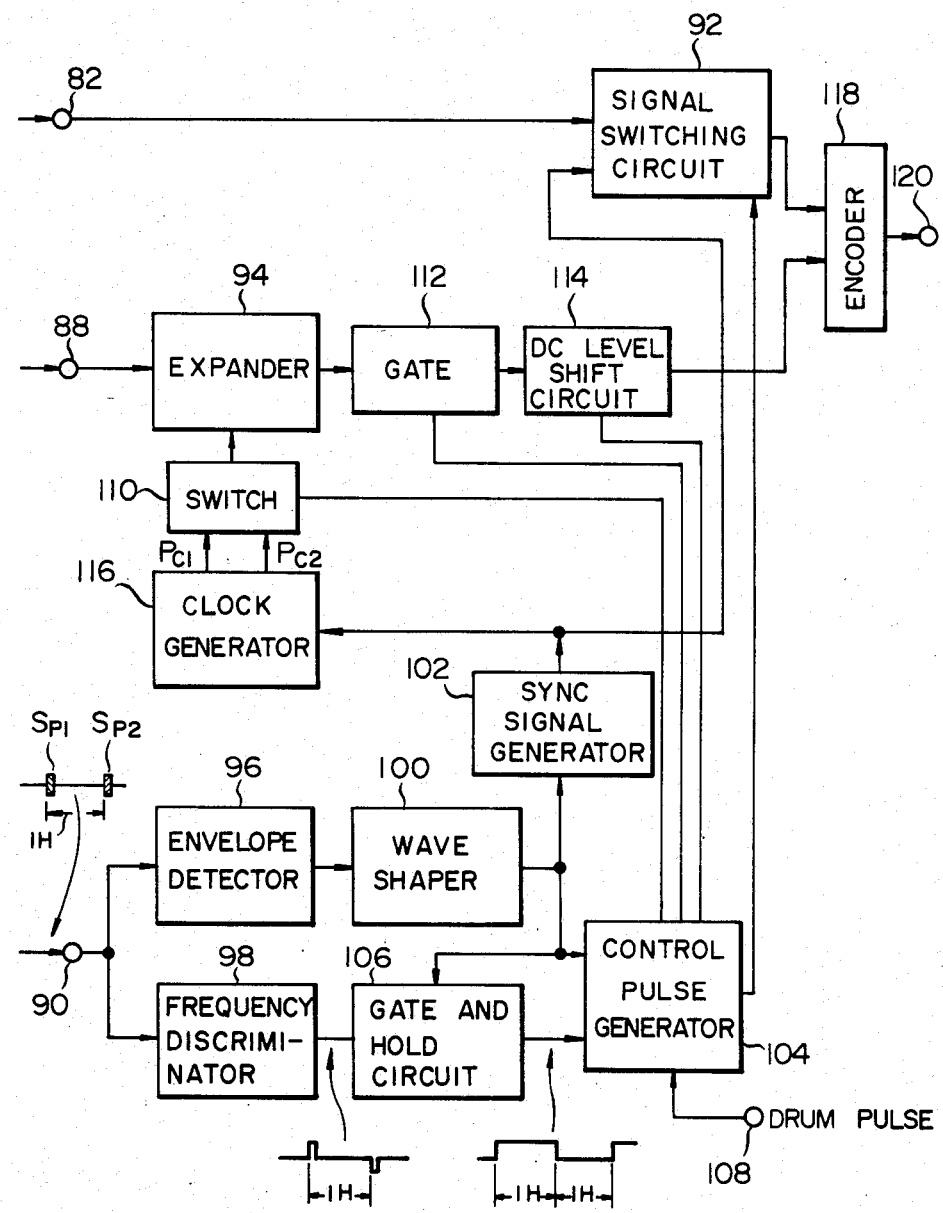
FIG. 7 is a block diagram of an exemplary playback arrangement also applicable to the present invention.

Referring to FIG. 7, an exemplary playback circuit which is connectable to the terminals of FIG. 6 is shown. In FIG. 7, the signal from the terminal 82 of FIG. 6 is applied to a signal switching circuit 92, the signal from the terminal 88 to a time-axis expansion circuit, or expander, 94, and each of the pilot signals $Sp_1$ and $Sp_2$ from the terminal 90 to an envelope detector 96 and a frequency discriminator 98. The envelope detector 96 (e.g. MATSUSHITA AN6326) generates a signal corresponding to envelopes of the pilot signals $Sp_1$ and $Sp_2$ and supplies it to a wave shaper 100. The output signal of the wave shaper 100 is routed to a sync signal generator 102 and a control pulse generator 104. The frequency discriminator 98 is adapted to generate positive and negative signals in response to the pilot signals $Sp_1$ and $Sp_2$ applied thereto and delivers them to a gate and hold circuit 106. Also supplied with an output of the wave shaper 100 as a gate signal, the gate and hold circuit 106 sends out pulses having a period of 2H to a control pulse generator 104. The control pulse generator 104, supplied with drum pulses from a terminal 108, generates various signals and control signals predetermined for a switch 110, a gate 112, a DC level shift circuit, the switching circuit 92, etc.

The sync signal generator 102 generates vertical sync signals, horizontal sync signals, equalizing pulses which are fed to the signal switching circuit 92, a clock signal generator 116, etc. The clock signal generator 116 may comprise a PLL circuit. Supplied with a sync signal from the sync signal generator 102, the clock signal generator 116 generates clock signals $Pc_1$ and $Pc_2$ which are selectively supplied to the expander 94 via the switch 110. The clock signal $Pc_1$ has a low repetition frequency, and the clock signal $Pc_2$ a high repetition frequency which is in a predetermined ratio to that of the clock signal $Pc_1$. The frequency ratio between the clock signals $Pc_1$ and $Pc_2$ has to be selected to be equal to the compression ratio assigned to the compressor 24; 1:5 in accordance with the described example.

The expander 94 may comprise a CCD or a digital circuit. In the following description, the expander 94 is assumed to be a 67-stage CCD as has been the case with the compressor 24. It will be needless to mention that the expander 94 may bifunction as the compressor 24. The expander 94 operates in the opposite manner to the compressor 24 to expand the time axis of the compressed color signals, thereby restoring the original color signals (R-Y) and (B-Y) from the compressed color signals (R-Y)c and (B-Y)c. That is, the expander 94 which is CCD, for example, restores the original color signals by storing the compressed color signal (R-Y)c or (B-Y)c in response to the higher repetition frequency clock $Pc_2$ and then delivering the stored signal in response to the lower repetition frequency clock $Pc_1$. Assuming that the repetition frequency of the clock $Pc_1$ is 1.25 MHz and that of the clock $Pc_2$ is 6.25 MHz as in the previously discussed example, the expansion ratio at the expander 94 is 5.

The output signal of the expander 94 is routed to an encoder 118 via the gate 112, DC level shift circuit 114 and the like. The gate 112 is disenabled while the expander 94 delivers signals other than color signals, thereby preventing needless signals from being applied to the encoder 118. The DC level shift circuit 114 is adapted to supply the encoder 118 with the (R-Y) and (B-Y) signals after controlling them to predetermined DC levels, in the case where the encoder 118 is constructed in accordance with the SECAM system. In this connection, the DC level shift circuit 114 is omissible if the encoder 118 conforms to a system other than the SECAM system.

Supplied to the signal switching circuit 92 is a multiplex signal from the terminal 82 of FIG. 6 in which a luminance signal Y is positioned in an effective horizontal scan period and superposed compressed color signals and pilot signals are positioned in a horizontal blanking period. The circuit 92 is constructed to generate a signal in which predetermined sync signals and the like are inserted in horizontal and vertical blanking periods of the signal applied thereto. In detail, the circuit 92 is controlled such that in each horizontal blanking period a horizontal sync signal from the sync signal generator 102 is applied to the encoder 118 while, in a vertical blanking period, a horizontal sync signal, equalizing pulse and vertical sync signal from the sync signal generator 102 are supplied to the encoder 118 if the signal mode in a vertical blanking period of the signal input to the circuit 92 is the mode shown in FIG. 5b or 5c and a signal in a vertical blanking period which accompanies a luminance signal is directly fed to the encoder 118 if the above-mentioned signal mode is the one shown in FIG. 5d. The encoder 118 has a construction which is capable of generating a signal based on a standard color TV system to which the color video signal to be applied to an output terminal 120 should belong.

In summary, it will be seen that the present invention provides a recording signal generation system for a color video signal which elimantes the need for positioning horizontal sync signals or compressed color signals in horizontal blanking periods on a time-division basis. This allows a time-division multiplex signal of a luminance signal and compressed color signals to be generated without modifying the duration of an effective horizontal scan period and that of a horizontal blanking period which are prescribed by a standard color TV system. Additionally, the system of the present invention promotes easy signal generation by maintaining various signals in a vertical blanking period in their signal mode in an original composite color video signal, or causing different kinds of burst pilot signals to alternate with each other at every two horizontal scan periods.

Various modifications will become possible for those skilled in the art after receiving the teachings of the present disclosure without departing from the scope thereof.

What is claimed is:

1. A recording signal generation system for a color video signal having horizontal scan periods each of which has an effective horizontal scan period and a horizontal blanking period arranged serially on a time axis, a luminance signal being positioned in the effective horizontal scan period, said system comprising:

first signal generator means for separating an input composite color video signal to generate the luminance signal and line sequential signal of two color difference signals which has a duration equal to the effective horizontal scan period;

second signal generator means for generating compressed color signals by compressing the line sequential signal with respect to the time axis by a predetermined ratio;

third signal generator means for positioning the compressed color signals in the horizontal blanking period and time-division multiplexing the luminance signal and the compressed color signals to generate a time-division multiplex signal of the luminance signal and the compressed color signals;

fourth signal generator means for generating a plurality of burst pilot signals having different frequencies superposed on the luminance signal plus the two color difference signals in the horizontal blanking period and which alternate with each other at an interval of one horizontal scan period;

fifth signal generator means for superposing the burst pilot signals on the time-division multiplex signal; and sixth signal generator means for generating a recording signal by frequency modulating a carrier having a predetermined frequency by the superposed signal.

2. A system as claimed in claim 1, in which the first signal generator means comprises a decoder.

3. A system as claimed in claim 1, in which the second signal generator means comprises CCD elements, the system further comprising clock signal generator means generating two different clock signals having a frequency ratio to each other which corresponds to the predetermined compression ratio for the line sequential signal, said two clock signals being supplied to the CCD elements.

4. A system as claimed in claim 3, in which the compression ratio is 1:5.

5. A system as claimed in claim 1, in which the third signal generator means comprises a switching circuit, said system further comprising control signal generator means for generating a control signal to actuate said switching circuit such that the luminance signal and the compressed color signals are serially arranged on the time axis.

6. A system as claimed in claim 1, in which the fourth signal generator is constructed to generate two burst pilot signals having different frequencies which alternate with each other at an interval of one horizontal scan period.

7. A system as claimed in claim 6, in which the frequency of each of the two burst pilot signals is an odd multiple of $\frac{1}{4}$ of a horizontal scanning frequency and lies in a high frequency range of the superposed signal.

8. A recording signal generation system for a color video signal having horizontal scan periods each of which has an effective horizontal scan period and a horizontal blanking period arranged serially on a time axis and a vertical blanking period having a snyc signal and a luminance signal in the effective horizontal scan period, a luminance signal being positioned in the effective horizontal scan period, said system comprising:

first signal generator means for separating an input composite color video signal to generate the luminance signal and a line sequential signal of two color difference signals which line sequential signal has a duration equal to the effective horizontal scan period;

second signal generator means for generating compressed color signals by compressing the line sequential signal with respect to the time axis by a predetermined ratio;

third signal generator means for positioning the compressed color signals in the horizontal blanking period and time division multiplexing the luminance signal and the compressed color signal to generate a time-division multiplex signal of the luminance signal and the compressed color signals;

fourth signal generator means for generating a plurality of burst pilot signals having different frequencies superposed on the luminance signal plus the two color difference signals in the horizontal blanking period and which alternate with each other at an interval of one horizontal scan period;

fifth signal generator means for superposing the burst pilot signals and the sync signal in the vertical blanking period on the time-division multiplex signal; and sixth signal generator means for generating a recording signal by frequency modulating a carrier having a predetermined frequency by the superposed signal.

* * * * *